United States Patent [19]

Cheng

[11] 4,055,525

[45] Oct. 25, 1977

[54] NOVEL POLYAMIDE ADHESIVES AND METHOD OF PREPARATION

[75] Inventor: Thomas T. Cheng, Lawrenceville, N.J.

[73] Assignee: Union Camp Corporation, Wayne, N.J.

[21] Appl. No.: 698,867

[22] Filed: June 23, 1976

[51] Int. Cl.$^2$ ............................................. C08G 69/26
[52] U.S. Cl. ............................... 260/18 N; 260/78 R; 260/78 TF; 260/404.5
[58] Field of Search .............. 260/78 R, 78 TF, 18 N, 260/404.5 PA

[56] References Cited

U.S. PATENT DOCUMENTS

| | | | |
|---|---|---|---|
| 2,891,084 | 6/1959 | Alm et al. ........................... | 260/78 R |
| 3,206,438 | 9/1965 | Jamison ............................... | 260/78 R |
| 3,700,618 | 10/1972 | Sharkey et al. .................... | 260/18 N |
| 3,781,234 | 12/1973 | Drawert et al. .................... | 260/18 N |
| 3,793,270 | 2/1974 | Goukon et al. .................... | 260/18 N |
| 3,847,875 | 11/1974 | Drawert et al. .................... | 260/78 R |
| 3,937,687 | 2/1976 | Rogier et al. ....................... | 260/18 N |
| 3,937,688 | 2/1976 | Rogier et al. ....................... | 260/18 N |
| 3,957,733 | 5/1976 | Rogier et al. ....................... | 260/18 N |

*Primary Examiner*—Eugene C. Rzucidlo
*Attorney, Agent, or Firm*—Kane, Dalsimer, Kane, Sullivan and Kurucz

[57] ABSTRACT

Novel polyamide hot melt adhesive compositions are disclosed together with a novel method of preparation. The process of the invention comprises condensation of hexamethylene diamine with an acid mixture of specific aliphatic $C_{19}$ dicarboxylic acids, aliphatic $C_6$–$C_{10}$ dicarboxylic acids and a specific class of $C_2$–$C_{27}$ monocarboxylic acids. The process is carried out initially in aqueous solvent and in the presence of a catalyst selected from phosphoric acid, magnesium oxide and calcium oxide. The adhesive compositions are particularly useful in adhering poromerics such as natural and synthetic leather goods. The compositions of the invention are also useful adhesives for adhering metals.

31 Claims, No Drawings

NOVEL POLYAMIDE ADHESIVES AND METHOD OF PREPARATION

BACKGROUND OF THE INVENTION

1. Field of the Invention

The invention relates to polyamide polymers having hot melt adhesive properties and more particularly relates to polyamide resins prepared by the reaction of an aliphatic diamine with aliphatic dicarboxylic acids.

2. Brief Description of the Prior Art

The prior art is replete with descriptions of polyamide compositions having hot-melt adhesive properties and the methods of their preparation. Representative of the prior art adhesive compositions are those described in U.S. Pat. No. 3,444,026. The latter compositions comprise the reaction product of a dimer fatty acid and a wide variety of diamines including hexamethylene diamine. Copolymerizing dicarboxylic acids including aliphatic dicarboxylic acids such as adipic, sebacic and azelaic acids, are also taught as components of the adhesive compositions.

Polyamide compositions useful as hot-melt adhesives for adhering plastics are also disclosed in U.S. Pat. No. 3,847,875. The latter compositions are the reaction product of 1,8- or 1,9-heptadecane dicarboxylic acid and specific heterocyclic diamines such as piperazine. Copolymerizable dicarboxylic acids such as azelaic, sebacic and adipic acids are also disclosed as components of the adhesives.

In U.S. Pat. No. 3,062,773 disclosure is made of aminopolyamide resins useful as curing agents for epoxy resins. These curing agents include the reaction product of $C_{19}$ dicarboxylic acids with large excesses of polyamines (exclusive of hexamethylene diamine). In U.S. Pat. No. 2,891,084, $C_{19}$ aliphatic dicarboxylic acids are disclosed and suggestion of their use in preparing polyamide resins by reaction with hexamethylene diamine made. In the latter reference, no disclosure of a useful adhesive polyamide is made.

The hot melt polyamide compositions of the invention are particularly advantageous for their melt viscosity and adhesive strength in adhering poromerics such as leather and metals. The compositions of the invention are particularly useful as an adhesive for shoe manufacture.

SUMMARY OF THE INVENTION

The invention comprises the polyamide obtained on condensation of substantially equivalent proportions of hexamethylene diamine and a mixture of acids, said mixture comprising aliphatic dicarboxylic acids of the formula:

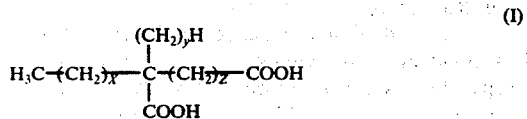

(I)

wherein X and Z are integers of from 0 to 15, inclusive, y is an integer of from 0 to 1 and the sum of $X + y + Z$ is 15; aliphatic dicarboxylic acids of the formula:

$$HOOC-R-COOH \quad (II)$$

wherein R represents alkylene of 4 to 8 carbon atoms, inclusive, and monocarboxylic acids of the formula:

(III)

wherein R' is selected from the group consisting of alkyl having 1 to 21 carbon atoms, inclusive, phenyl and hydroxy-substituted phenyl; the ratio of the moles of acid of formula (I) to the moles of acid of formula (II) in said mixture being in the range of from 1–2 to 1 and the ratio of the sum of the moles of acids of formulae (I) and (II) to the moles of formula (II) being from 1 to 0.0–0.08; said condensation being carried out in the presence of a catalytic proportion of a catalyst selected from the group consisting of phosphoric acid, magnesium oxide and calcium oxide.

The term "alkylene of 4 to 8 carbon atoms" is used throughout the specification and claims to mean the divalent moiety obtained upon removal of two hydrogen atoms from a hydrocarbon having the stated carbon content. Representative of alkylene of 4 to 8 carbon atoms are butylene, pentylene, hexylene, heptylene, octylene and isomeric forms thereof.

The term "alkyl having 1 to 21 carbon atoms" as used herein means the monovalent moiety obtained upon removal of a single hydrogen atom from a hydrocarbon. Representative of alkyl having 1 to 18 carbon atoms is methyl, ethyl, propyl, butyl, pentyl, hexyl, heptyl, octyl, nonyl, decyl, undecyl, dodecyl, tridecyl, tetradecyl, pentadecyl, heptadecyl, octadecyl, nonadecyl, eicosyl, heneiscosyl and isomeric forms thereof.

The polyamides of the invention are useful hot melt adhesives, particularly for adhering poromeric materials such as leather and the like.

The invention also comprises a method of preparing the polyamide hot-melt adhesives of the invention, which comprises;

initially reacting, in the presence of an excess of an aqueous solvent, substantially equivalent proportions of hexamethylene diamine and a mixture of acids of the formulae (I), (II) and (III) above, wherein the ratio of moles of acid of formula (I) to moles of acid of formula (II) is in the range of from 1–2:1 and the ratio of the sum of acids of formulae (I) and (II) to moles of acid of formula (III) is from 1:0.0–0.08, and polymerizing the product of said reacting at a temperature within the range of from about 250° C. to about 300° C. in the presence of a catalytic proportion of a catalyst selected from the class consisting of phosphoric acid, magnesium oxide and calcium oxide.

The term "excess of an aqueous solvent" as used throughout the specification and claims means a proportion of aqueous solvent for the diamine, including water, in excess of that necessary to completely dissolve the hexamethylene diamine at room temperature.

The term "catalytic proportion" is used herein in the usual sense as meaning that proportion which will catalyse the desired polymerization. In general such a proportion is within the range of from about 0.1 to about 5 percent by weight of the reactants.

DETAILED DESCRIPTION OF THE INVENTION

The polyamide composition of the invention are characterized in part by a softening point within the range of from about 150° C. to about 200° C., preferably 160° C. to 170° C. and a final melt viscosity of at least 1,500 cps, preferably within the range of from about 1,500 to about 56,000 and most preferably between 2,000 to 8000 cps. The polyamide compositions of the invention are generally soluble in n-butanol, have tensile strengths of at least 1,000 psi, preferably at least 2,000 and elongations within the range of from about 100 to about 850 percent. The acid and amine numbers are generally each less than 10, preferably less than 5.

The polyamide compositions of the invention are also generally relatively light in color, i.e., having Gardner colors of circa 3–4.

The polyamide hot melt adhesives of the invention may be prepared according to the method of the invention by first mixing, heating and reacting the mixture of acids of formulae (I), (II) and (III) with a substantially equivalent proportion of hexamethylene diamine. Any conventional and convenient reaction vessel may be used. By "substantially equivalent proportion" it is meant that the total number of amine groups provided in the reaction mixture should approximate the total number of acid groups presented by the acid mixture of acids of the formulae (I), (II) and (III). In practice this is accomplished by providing a slight excess (circa 2 percent) of the diamine in the initial reaction mixture to compensate for the small proportion usually lost through volatilization under the conditions of the aminization reaction. The temperature at which this first heating and reacting is carried out is not critical, but is advantageously carried out at a temperature of from about 60° C. to about 200° C., preferably within the range of from about 125° C. to 150° C.

In admixing the diamine with the acid reactants, according to the preferred method of the invention, the diamine is first dissolved in an excess of water and then added to the mixture of acids of the formulae (I), (II) and (III). Generally in the preparation of a polyamide resin the presence of substantial proportions of water is considered undesirable for the progress of the polymerization. Unexpectedly, the addition of excess water to the initial reaction mixture in the method of the invention as described above has advantageous results. The water present in the initial stages of the reaction is then removed toward the end of the polymerization by heating the reaction mixture under reduced atmospheric pressure. When the diamine reactant hexamethylene diamine is initially dissolved in a proportion of water in excess of that required to completely dissolve the diamine at room temperature and the aqueous solution is added to the mixture of acid reactants of the formulae (I), (II) and (III), the reaction progresses toward completion more readily. For example, a more efficient refluxing is obtained and a better solubilizing effect is observed during the early stages of the reaction when the amine salt is initially formed. As a result, the product resin is more homogeneous and has improved clarity. In contrast, when no excess of water is used (only a minimum proportion to effect dissolution of the hexamethylene diamine), low molecular weight polymer forms in the early stages of the process and adheres to the upper parts of the reaction vessel. The product polyamide resin is always less homogeneous than the product of the method of the invention and is comparatively "hazy" in appearance. For further comparison, the use of an organic solvent for the diamine such as xylene causes the reaction mixture to solidify in the early stages of reaction when the amine salt is formed. This is of course undesirable.

To avoid foaming of the reacts during the initial reaction, it is advantageous to add the diamine component slowly to the warm mixture of acids of formulae (I), (II) and (III). Preferably the aqueous solution of the diamine component is added to the mixture of acids of the formulae (I), (II) and (III) at a temperature of circa 130° C. to 150° C., preferably adding the last of the diamine as the reaction mixture reaches a temperature of circa 140° C. In this way it is possible to operate with a minimum of foaming.

Upon completion of the addition of the hexamethylene diamine reactant to the mixture of acids of the formulae (I), (II) and (III) polymerization of the reaction product is carried out in the presence of the aforementioned catalysts by heating the reaction mixture to a temperature of from about 250° C. to about 300° C., preferably 275° C. to 300° C. Advantageously the desired temperature range of at least 250° C. is reached as rapidly as is practicable and held at the desired temperature until polymerization is complete. Completion of the polymerization may be observed when aliquots of the reaction mixture, taken periodically, indicate by analysis that the acid and amine numbers for the reaction mixture are each less than about 10, preferably less than 5. Generally polymerization is complete within about 1 to 7 hours, depending on the specific nature of the acid reactants (I), (II) and (III).

The method of the invention may be carried out at atmospheric pressures. However, toward the end of the polymerization step it is advantageous to operate under a slight vacuum. This aids in removal of by-products, solvent and condensation water, unreacted diamine and in driving the polymerization to completion.

The catalyst employed in the method of the invention may be charged to the initial reaction mixture or added just prior to polymerization. The preferred concentration of catalyst is within the range of from about 0.3 to 3 percent, most preferably 1 percent by weight of the diamine ractant.

It is advantageous to include as a component of the polymerization reaction mixture, an antioxidant. Any of the well known antioxidants may be employed in conventional proportions, i.e., from 0.1 to about 2 percent by weight of the reactants.

In order to avoid undue discoloration of the polyamide product, the method of the invention is preferably carried out in an inert atmosphere such as is provided by carbon dioxide, nitrogen or methane gases. During the course of the reaction, amidization occurs with formation of long linear molecules and water. The formed water is allowed to distill out of the reaction mixture. Distillation may be assisted by allowing a slow stream of inert gas such as nitrogen to be bubbled through the reaction mixture. Although not necessary, an inert organic solvent such as xylene may be added to the reaction mixture in small proportions to assist removal of water by azeotropic distillation. Generally such proporticn should not exceed about 10 percent by weight of the reaction mixture.

The reactant aliphatic dicarboxylic acid of formula (I) described above is a well known class of acids as is their preparation; see for example U.S. Pat. No. 2,831,877, example 10; U.S. Pat. No. 3,270,035; PRYDE et al., J. Amer. Oil Chemists' Soc., 49, 451; LAI et al., Chem. Phys. Lipids, 10(4), 291–302, (1973); and Falbe, Carbon Monoxide in Organic Synthesis, Springer-Verlog, N.Y. (1970), pps 125–130. In general, they are prepared by carboxylation of oleic acid and are obtained in complex mixtures of isomers due to the migration of the double bond during carboxylation.

The aliphatic dicarboxylic acids of formula (II) above are also a well known class of acids as is their preparation. Representative of such acids are adipic acid, 1,5-pentanedioic acid, 1,6-hexanedioic acid, pimelic acid, suberic acid, α-methylpimelic acid, azelaic acid and the like.

The monocarboxylic acids of the formula (III) described above are also generally well known as is their preparation. Representative of the acids of formula (III) are acetic, propionic, butyric, n-valeric, neopentanoic, heptanoic, 3-ethylhexanoic, pelargonic, decanoic, undecanoic, dineopentylacetic, tridecanoic, myristic, pentadecanoic, hexadecanoic, heptadecanoic, palmitic, stearic, oleic, arachidic, behenic, benzoic, salicylic and like acids. The softening points of the adhesive polyamide compositions of the invention are not greatly affected by the selection of any particular monocarboxylic acid of the formula (III). However, use of the lower molecular weight aliphatic acids such as acetic and neopentanoic and pelargonic acids generally result in compositions of the invention characterized by the highest melt viscosity and higher tensile strengths than are obtainable when the monocarboxylic acid (III) is of the higher molecular weight acids.

The following examples and preparations describe the manner and process of making and using the invention and set forth the best mode contemplated by the inventor of carrying out the invention, but are not to be construed as limiting.

TEST METHODS

The test methods used for evaluating the polyamide compositions of the invention as hot melt adhesives are as follows.

1. Tensile and elongation tests — Two test methods were employed to measure the tensile strengths and percent elongation of representative films cast from the polyamide compositions of the invention. In the method referred to hereinafter as "METHOD A" (Reference ASTM D-412, D-1248-60T) — Resin dumbbells are conditioned at 77° F. and 50% relative humidity for 24 hours and then tested at two crosshead speeds on an Instron tester to demonstrate rate of force effect on elongation and tensile strengths. In the method referred to hereinafter as "METHOD B", the ASTM 1708-66 method was adopted using the Instron tester. The test specimens (resin dumbbells) were conditioned at 24° C. and 50% relative humidity for 24 hours prior to testing.

2. Leather to leather lap shear — Specimens are subjected to various static loads while held at 135° C. to test the materials tendency to cold flow. Lap shear specimens are bonded from 1 inch × 3 inches pieces of leather using 0.3 grams of polyamide applied to a 1 square inch area. All specimens are conditioned at 77° F. and 50% relative humidity for 24 hours before testing. Time to failure up to 24 hours is noted.

Leather lap shear specimens are also loaded at 160g and subjected to a temperature increase of 50° C. each 15 minutes until bond failure (SSTP No. 144). Oven temperature at failure is an indication of the maximum temperature a leather bond might withstand under very low loading.

3. Aluminum/Aluminum shear strength — aluminum panels 0.064 inches thick are given a dichromate etch and then bonded with polyamide resin at 20° C. above the resin's melting point. 1 inch × 3 inches areas are bonded in the lap shear made with a bond thickness of 1 mil. After conditioning specimens at 77° F. and 50 % relative humidity they are tested at a crosshead speed of 0.2 inches/minute on the Instron tester.

4. Steel/Steel shear strength — steel panels 0.032 inches thick are used for these tests. Both bonderized (phosphatetreated) and untreated panels are used. The same sample preparation and test parameters are used as described for aluminum shear strengths.

In both aluminum and steel lap shear tests, specimens are prepared as indicated above and conditioned as indicated in the table of data accompanying the examples. Specimens were immediately tested after conditioning by striking them sharply on the edge of a lab bench. Ratings are as follows:

Poor — Bond fails after light blow.
Fair — Bond fails after heavy blow.
Good — No bond failure after heavy blow.

5. Acid Values — acid numbers were determined by the method of ASTM-D 1980-61 employing n-butanol as the solvent.

6. Amine Values — amine numbers were determined by the method of ASTM-D 2074-62-T using n-butanol as the solvent.

7. Softening Point — determined by the method of ASTM-E 28-63 (ring and ball method).

8. Melt Viscosity — the model RTV Brookfield viscosmeter was employed with a thermosel unit attached for measuring small samples.

PREPARATION 1

PREPARATION OF ACIDS OF THE FORMULA (I)

Sulfuric acid (97.2% concentration, 350 milliliters) is charged to a 2 liter, Parr 316 stainless steel reactor. After purging with nitrogen and checking for leaks, carbon monoxide is introduced and the reactor pressured to circa 500 psig with carbon monoxide. The acid is stirred for 30 minutes to saturate it with carbon monoxide, the reactor being cooled in a water or ice bath. Oleic acid (114 grams, 129 milliliters) is pumped from a buret into the reactor over a period of 15 minutes using a 1000 psi Milton Roy mini-pump, carbon monoxide being added to maintain the pressure. The reaction is continued for an additional 2 hours at the end of which time the reaction mixture is discharged into an ice water bath and stirred for approximately 10 minutes. The crude $C_{19}$ diacid product is extracted with cyclohexane and the extract solution washed with water until the washings are neutral. The cyclohexane is removed by distillation under reduced pressure and the Crude $C_{19}$ diocid is distilled. The Crude $C_{19}$ diacid is distilled through a 2 plate Oldershaw column under reduced pressure to obtain a mixture of isomers of the formula (I), above.

PREPARATION 2

PREPARATION OF CRUDE MIXTURE OF COMPOUNDS OF THE FORMULA (I)

Following the procedure of Preparation 1, supra., but replacing the oleic acid as used therein with an equal proportion of partially hydrogenated tall oil fatty acids there is obtained a crude mixture of compounds of the formula (I) having an acid number of 330.

The products of Preparations 1 and 2 are each mixtures of dicarboxylic acids commonly referred to as "$C_{19}$" diacids. The principal diacid is a mixture of roughly 75% tertiary-primary and 25% secondary-primary isomers of the formula (I) in admixture with secondary isomers formed by migration of the double bond in the oleic acid feedstock followed by addition of the elements of formic acid across it and also many tertiary isomers formed by skeletal isomerization to a tertiary carbonium ion followed by carboxylation of that carbonium ion.

EXAMPLE 1

A glass resin kettle fitted with a means of stirring, a nitrogen inlet tube, thermometer, heating means, condenser and dropping funnel is charged with 218.7 grams (0.666 moles) of the product $C_{19}$ diacid obtained according to the procedure of PREPARATION 1, supra., 48.6 grams (0.333 moles) of adipic acid, 5.13 grams (0.02 moles) of palmitic acid, 1.15 grams (0.01 moles) of 85% phosphoric acid and 3.59 grams of Carstab 601 (anti-oxidant, typical M.P. 96°–99° C., Cincinnati Milacron Chem. Co., Inc., Reading, Ohio). The charge is heated with stirring to a temperature of 132°–140° C. to obtain a homogeneous mixture, whereupon 121.2 grams (1.044 moles) of hexamethylene diamine dissolved in 50 milliliters of water is added dropwise over a period of about 15 minutes while stirring is continued. After addition of the diamine, the reaction vessel is purged of air with nitrogen gas through a sparge tube and the reaction mixture heated to a temperature of 275° C. over a period of 20 minutes. While maintaining this temperature and the nitrogen gas atmosphere for a period of 5 hours, the water of condensation is removed from the reaction mixture by distillation. At the end of this time, nitrogen sparging is discontinued and vacuum applied (0.3 to 0.5 torr) for 1 hour. Nitrogen gas is then introduced to break the vacuum and the resulting mixture cooled to about 225° C. The cooled resin is cast on a stainless steel sheet to obtain a film. The film is tested for its physical properties and the results are shown in Table I, below.

Similarly, repeating the above procedure but replacing the $C_{19}$ diacid of Preparation 1, supra., as used therein with an equal equivalent of the crude $C_{19}$ diacid of Preparation 2, supra., polyamide hot melt adhesive resins of the invention are obtained.

EXAMPLES 2–4

Following the procedure of Example 1, supra., but varying the proportion of palmitic acid as used therein, additional films are obtained. The films so obtained are tested for physical properties. The test results and the proportions of palmitic acid employed are shown in Table I, below.

TABLE I

| Example No. | 1 | 2 | 3 | 4 |
|---|---|---|---|---|
| Moles Palmitic Acid | 0.02 | 0.03 | 0.05 | 0.08 |
| Acid Value | 2.0 | 3.1 | 2.0 | 1.4 |
| Amine Value | 2.6 | 3.3 | 2.0 | 3.7 |
| Softening Point, ° C | 165–167 | 167–168 | 160–162 | 160–162 |
| Melt Viscosity, cps | | | | |
| Initial* | 13,100 | 5220 | 3500 | 2700 |
| Final (24 hrs) | 11,600 | 5530 | 3100 | 2860 |
| Mechanical Properties (Method B) | | | | |
| Tensile Strength, psi | 2840 | 2350 | 1200 | — |
| Elongation, % | 370 | 320 | 450 | — |

*Measured at 205° C immediately after the reaction.

EXAMPLES 5–10

The procedure of Example 3, supra., is followed in each of Examples 5–10, inclusive, but replacing the palmitic acid as used therein with an equal molar proportion of acetic acid, neopentanoic acid, pelargonic acid, stearic, acid, oleic acid and salicyclic acid, respectively. The films obtained are tested for physical properties. The test results obtained and the monobasic acid used are shown in Table II below. For comparison purposes, the test results for the film of Example 3 are presented again in Table II.

TABLE II

| Example No. | 3 | 5 | 6 | 7 | 8 | 9 | 10 |
|---|---|---|---|---|---|---|---|
| Monobasic Acid | Palmitic | Acetic | Neopentanoic | Pelargonic | Stearic | Oleic | Salicylic |
| Acid Value | 2.0 | 1.3 | 1.4 | 1.3 | 1.2 | 1.3 | 2.5 |
| Amine Value | 2.0 | 1.5 | 3.5 | 2.1 | 3.6 | 2.0 | 6.5 |
| Softening Point, ° C | 160–162 | 164–166 | 164–166 | 164–165 | 164–165 | 165–166 | 165–166 |
| Melt Viscosity, cps | | | | | | | |
| Initial* | 3500 | 6000 | 5900 | 4600 | 2700 | 3000 | 26,000 |
| Final (24 hrs) | 3100 | 6000 | 6100 | 4600 | 3000 | 3300 | 23,000 |
| Mechanical Properties (Method B) | | | | | | | |
| Tensile Strength, psi | 1200 | 1600 | 2300 | 1800 | — | — | 1,620 |
| Elongation, % | 450 | 370 | 400 | 440 | — | — | 330 |

*Measured at 205° C immediately after the reaction.

EXAMPLE 11

A glass resin kettle fitted with a means of stirring, a nitrogen inlet tube, thermometer, heating means, condenser and dropping funnel is charged with 164.27 grams (0.5 moles) of the product $C_{19}$ diacid obtained according to the procedure of Preparation 1, supra., 73.07 grams (0.5 moles) of adipic acid, 7.69 grams (0.03 moles) of palmitic acid, 1.15 grams (0.01 moles) of 85% phosphoric acid and 3.59 grams of Carstab 601. The charge is heated with stirring to a temperature of 132°–140° C. to obtain a homogeneous mixture, whereupon 122.37 grams (1.053 moles) of hexamethylene diamine dissolved in 50 milliliters of water is added dropwise over a period of 15 minutes with continued stirring. The reaction vessel is then purged of air with nitrogen gas through a sparge tube and the reaction mixture is then heated to a temperature of 275° C. over a period of 20 minutes. While maintaining this temperature and the nitrogen gas atmosphere for 5 hours, the water of condensation is removed from the reaction mixture by distillation. After the end of the 5 hour period, nitrogen sparging is terminated and vacuum applied (0.3 to 0.5 Torr) for one hour. Nitrogen gas is then introduced to break the vacuum and the resulting mixture cooled to about 225° C. the cooled resin is cast on a stainless steel sheet to obtain film. Upon testing, the film is shown to be characterized by the following physical properties.

| | |
|---|---|
| Acid value | 2 |
| Amine value | 3 |
| Softening point | 195–197° C. |
| Melt Viscosity, cps | |

| -continued | |
|---|---|
| Initial* | 21,000 |
| Final (24 hrs) | 100,000 |
| Mechanical Properties (Method B) | |
| Tensile strength psi | 3800 |
| ELongation, % | 100 |

*Measured at 205° C. immediately after the reaction.

EXAMPLE 12

Following the procedure of Example 11, supra., but replacing the adipic acid as used therein with an equal molar proportion of azelaic acid and reducing the proportion of palmitic acid to 0.02 moles, a film is obtained. The film is tested for its physical properties. The test results are shown in Table III below.

EXAMPLE 13

Following the procedure of Example 12, supra., but increasing the proportion of palmitic acid to 0.05 moles, a film is obtained. The film is tested for its physical properties. The test results are shown in Table III below.

TABLE III

| Example No. | 12 | 13 |
|---|---|---|
| Dibasic acid | Azelaic | Azelaic |
| Monobasic acid, mole % | 0.02 | 0.05 |
| Dibasic acid/$C_{19}$ diacid, mole/mole | 1/1 | 1/1 |
| Acid value | 2 | 2 |
| Amine value | 5 | 3 |
| Softening point, ° C. | 163–166 | 162–164 |
| Melt Viscosity, cps | | |
| Initial * | 56,000 | 6700 |
| Final (24 hours) | 44,000 | 7200 |
| Mechanical Properties (Method B) | | |
| Tensile strength, psi | 2300 | 1200 |
| Elongation, % | 370 | 450 |

*Measured at 205° C. immediately after the reaction.

EXAMPLE 14

Following the procedure of Example 2, supra., but replacing the adipic acid as used therein with an equal molar proportion of sebacic acid, a film is obtained. The film is tested for physical properties. The test results are shown below.

| Monobasic acid moles | 0.03 |
|---|---|
| Acid value | 4 |
| Amine value | 4 |
| Softening point, ° C | 154–156 |
| Melt Viscosity, cps | |
| Initial * | 1700 |
| Final (24 hrs) | 2100 |
| Mechanical Properties (Method B) | |
| Tensile strength, psi | Broke |
| Elongation, % | Broke |

*Measured at 205° C. immediately after the reaction

EXAMPLE 15

There is charged into a glass resin kettle, fitted with a mechanical stirrer, nitrogen inlet tube, a thermometer connected to a temperature controller, a condenser, and a dropping funnel, 218.7 grams (0.666 moles) of the $C_{19}$ diacid, prepared according to Preparation 1 supra., 48.6 grams (0.333 moles) of adipic acid, 5.13 grams (0.02 moles) of palmitic acid, 0.978 grams (0.0085 moles) of 85% phosphoric acid and 3.59 grams of Carstab 601. The resulting mixture is heated by an electrical mantel and stirred gently until homogeneous. When the temperature reaches 132°–140° C., 121.2 grams (1.043 moles) of hexamethylene diamine dissolved in 50 milliliters of water is added drop-wise over a period of 15 minutes. Some water is distilled off during the addition and is collected in a graduated cylinder. After the diamine addition is complete, nitrogen gas sparging is carried on and the reaction mixture is heated to 275° C. over 20 minutes. The temperature is then held at this point while the water of condensation is removed by nitrogen sparge. Small samples are taken at 1 and 3 hours respectively after reaching 275° C., for acid value determination (2.137 and 2.121 respectively) and amine value determination (0.723 and 0.716 respectively). After four hours, nitrogen sparging is discontinued and vacuum (0.3 to 0.5 Torr) is applied for 1 hour. Nitrogen gas is then introduced to break the vacuum, and the resulting mixture cooled to approximately 225° C. and cast on a stainless steel sheet to obtain a film. The film so obtained is then tested for its physical properties. The results of the tests are shown in Table IV below.

EXAMPLE 16

The same procedure as in Example 15 is used to prepare the polyamide from the following materials: $C_{19}$ diacid 165.0 grams (0.500 moles), sebacic acid 45.0 grams (0.222 moles), adipic acid 40.7 grams (0.278 moles), palmitic acid 7.71 grams (0.03 moles), 85% phosphoric acid 0.978 grams (0.0085 moles), 3.44 grams of Carstab 601 supra., hexamethylene diamine 122.1 grams (1.051 moles) in 50 milliliters of water. Acid numbers at 1 and 3 hours after reaching 275° C. were 2.040 and 2.078 respectively and amine numbers were 0.995 and 0.992 respectively. Properties of this product are given in Table IV, below.

TABLE IV

| | Example 15 | Example 16 |
|---|---|---|
| Tensile (psi) (Method A) | | |
| 2.0 ″/min | 2700 | 1930 |
| 0.2 ″/min | 2260 | 2400 |
| Elongation at Break (Method A) | | |
| 2.0 ″/min | 1900 | — |
| 0.2 ″/min | 2000 | 2000 |
| Leather/Leather Shear at 135° C with Static Load | | |
| at 160 g | 24+ hrs | 24+ hrs |
| at 454 g | 24+ hrs | 24+ hrs |
| at 1000 g | 24+ hrs | 24+ hrs |
| Leather/Leather Shear Temperature (° C) | 167 | 165 |
| Melt Viscosity (cps) (Brookfield, 205° C) | 5200 | 5200 |

EXAMPLE 17

Following the procedure of Example 15, supra., a film is prepared with the following reactants and proportions. $C_{19}$ diacid, of Preparation 1, supra., 218.7 grams (0.667 moles), adipic acid, 48.6 grams (0.333 moles), 85% phosphoric acid, 0.978 grams (0.0085 moles), Carstab 601, supra., 3.55 grams, and hexamethylene diamine, 119.5 grams (1.03 moles) in 50 milliliters of water. Acid numbers of samples taken at 1 and 3 hours were 3.158 and 3.166 respectively and amine numbers were 0.553 and 0.544 respectively. The film obtained is tested for physical properties and the test results are shown below.

| Tensile strength (psi) (Method A) | |
|---|---|
| 2.0 ″/min | 3440 |
| 0.2 ″/min | 3380 |

| | |
|---|---|
| Elongation at Break (Method A) | |
| 2.0 "/min | 425 |
| 0.2 "/min | 800 |
| Leather/Leather Shear Temperature | 171 |
| Aluminum/Aluminum Shear (psi) | 1300 |
| Steel/Steel Shear (psi) (Bonderized) | 1900 |
| Steel/Steel Shear (psi) Untreated | 1400 |
| Melt Viscosity (cps) (Brookfield, 205° C) | 11,400 |
| Softening point | 167° C |
| Impact Resistance 0° F. | Good |
| 77° F | Good |
| 77° F after 24 hours H₂O Immersion | Good |

EXAMPLE 18

Following the general procedure of Example 15, supra., but employing the following reactants and proportions a film is obtained. $C_{19}$ diacid (prepared according to Preparation 1, supra) 54.7 grams (0.167 moles), azealic acid 31.3 grams (0.166 moles), palmitic acid 4.3 grams (0.0167 moles), 85% phosphoric acid 0.326 grams (0.0028 moles), 2,6-di-tertiary-butyl-p-cresol 0.67 grams and hexamethylene diamine 41.5 grams (0.357 moles) in 17 milliliters of water.

The acid and amine values after 3 hours at 275° C. are 2 and 3 respectively. The softening point of the film is 164°, melt viscosity (in centipoises) 6700, tensile strength (in psi) 1200, and elongation (in percent) 450.

EXAMPLE 19

Three separate films were prepared following the procedure of Example 3, supra., but in the preparation of one the proportion of phosphoric acid was increased to 0.03 moles. In the second, the proportion of phosphoric acid catalyst was reduced to 0.003 moles and in the third no phosphoric acid was included. The films were tested for physical properties. The test results are shown below in comparison to the test results of the film of Example 3.

Example 19

| Run No. | 1 | 2 | 3 | Example No. 3 |
|---|---|---|---|---|
| Moles of catalyst used | None | 0.003 | 0.03 | 0.01 |
| Acid value | 7 | 4 | 1 | 2 |
| Amine value | 2 | 1 | 3 | 2 |
| Softening point, ° C | 164–167 | 168–170 | 166–167 | 160–162 |
| Melt Viscosity, cps | | | | |
| Initial* | 1800 | 2300 | 1200 | 3500 |
| Final (24 hrs) | 1700 | 2200 | 2600 | — |
| Mechanical Properties (Method B) | | | | |
| Tensile strength, psi | 420 | 1100 | 1200 | 1200 |
| Elongation, % | 290 | 440 | 250 | 450 |

*Measured at 205° C immediately after the reaction.

EXAMPLE 20

Following the procedure of Example 3, supra., but replacing the phosphoric acid catalyst is used therein with an equal molar proportion of calcium oxide in one run and of magnesium oxide in a second run, two films are obtained. When tested for physical properties the following results were obtained

| Run No. | 1 | 2 |
|---|---|---|
| Catalyst | CaO | MgO |
| Acid value | 0.9 | 3.6 |
| Amine value | 5.6 | 6.6 |
| Softening point, ° C | 158–161 | 162–164 |
| Melt viscosity, cps | | |
| Initial* 7300 | 3700 | |
| Final | 7500 | 3700 |
| Conditioned | — | 3200 |
| Elongation, % | 450 | 440 |
| Tensile strength, psi (Methocd B) | 1200 | 850 |

*Measured at 205° C immediately after the reaction.

EXAMPLE 21

Similarly, repeating the procedure of Example 1, supra., but replacing the palmitic acid as used therein with an equal proportion of benzoic acid, a hot-melt polyamide composition within the scope of the invention is obtained.

What is claimed is:

1. The polyamide obtained on condensation of substantially equivalent proportions of hexamethylene diamine and a mixture of acids, said mixture comprising aliphatic dicarboxylic acids of the formula:

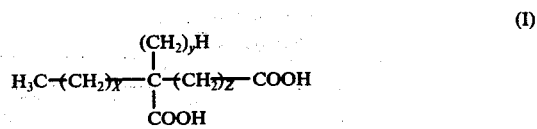

wherein X and Z are integers of from 0 to 15, inclusive, y is an integer of from 0 to 1 and the sum of $X + y + Z$ is 15; aliphatic dicarboxylic acids of the formula:

$$HOOC-R-COOH \qquad (II)$$

wherein R represents alkylene of 4 to 8 carbon atoms, inclusive and monocarboxylic acids of the formula:

$$R'-COOH \qquad (III)$$

wherein R' is selected from the group consisting of alkyl having 1 to 21 carbon atoms, inclusive, phenyl and hydroxy-substituted phenyl; the ratio of the moles of the acid of formula (I) to the moles of acid of formula (II) in said mixture being in the range of from 1–2:1 and the ratio of the sum of the moles of acids of formulae (I) and (II) to the moles of formula (III) being from 1:0.0–0.08; said condensation being carried out in the presence of a catalytic proportion of a catalyst selected from the group consisting of phosphoric acid, magnesium oxide and calcium oxide and in the presence of an excess of an aqueous solvent.

2. The polyamide of claim 1 wherein said acid of formula (I) is the isomeric mixture obtained upon carboxylation of oleic acid.

3. The polyamide of claim 1 wherein said acid of formula (I) is provided in the crude mixture obtained upon carboxylation of a partially hydrogenated tall oil fatty acid.

4. The polyamide of claim 1 wherein said acid of formula (II) is adipic acid.

5. The polyamide of claim 1 wherein said acid of formula (II) is azelaic acid.

6. The polyamide of claim 1 wherein said acid of formula (II) is sebacic acid.

7. The polyamide of claim 1 wherein said acid of formula (III) is salicylic acid.

8. The polyamide of claim 1 wherein said acid of formula (III) is oleic acid.

9. The polyamide of claim 1 wherein said acid of formula (III) is palmitic acid.

10. The polyamide of claim 1 wherein said acid of formula (III) is stearic acid.

11. The polyamide of claim 1 wherein said acid of formula (III) is acetic acid,

12. The polyamide of claim 1 wherein said acid of formula (III) is neopentanoic acid.

13. The polyamide of claim 1 wherein said acid of formula (III) is pelargonic acid.

14. The polyamide of claim 1 wherein the molar ratio of acids of formula (I) to acids of formula (II) is 2:1 and the molar ratio of the sum of acids of formulae (I) and (II) to acids of formula (III) is 1:0.06.

15. The polyamide of claim 1 wherein said catalyst is phosphoric acid.

16. The polyamide of claim 1 wherein said catalyst is calcium oxide.

17. The polyamide of claim 1 wherein said catalyst is magnesium oxide.

18. The polyamide of claim 1 wherein said condensation is carried out at a temperature of from about 250° C. to about 300° C.

19. The polyamide of claim 18 wherein said temperature is 275° C.

20. A method of preparing a polyamide hot-melt adhesive, which comprises;

reacting, in the presence of an excess of an aqueous solvent, substantially equivalent proportions of hexamethylene diamine and a mixture of acids, said mixture comprising aliphatic dicarboxylic acids of the formula:

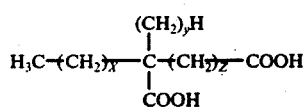 (I)

wherein X and Z are integers of from 0 to 15, inclusive, y is an integer of from 0 to 1 and the sum of X + y + Z is 15; aliphatic dicarboxylic acids of the formula:

HOOC—R—COOH (II)

wherein R represents alkylene of 4 to 8 carbon atoms, inclusive and monocarboxylic acids of the formula:

R'—COOH (III)

wherein R' is selected from the group consisting of alkyl having 1 to 21 carbon atoms, inclusive, phenyl and hydroxy-substituted phenyl; the ratio of moles of acid of formula (I) to the moles of acid of formula (II) in said mixture being in the range of from 1–2:1 and the ratio of the sum of the moles of acids of formulae (I) and (II) to the moles of formula (III) being from 1.0:0.0–0.08; and polymerizing the product of said reacting at a temperature within the range of from about 250° C. to about 300° C. in the presence of a catalytic proportion of a catalyst selected from the class consisting of phosphoric acid, magnesium oxide and calcium oxide.

21. The method of claim 20 wherein said reacting is carried out at a temperature of from about 60° C. to about 200° C.

22. The method of claim 20 wherein said reacting is from about 125° C to about 150° C.

23. The method of claim 20 wherein phosphoric acid is present in said mixture.

24. The method of claim 20 wherein said polymerizing is carried out at a temperature of about 275° C. to 300° C.

25. The method of claim 20 wherein said mixture includes an antioxidant.

26. The method of claim 20 carried out in an inert atmosphere.

27. The method of claim 20 wherein said catalytic proportion is within the range of from 0.1 to 5 percent by weight of the reactants.

28. The method of claim 27 wherein said proportion is within the range of from about 0.3 to 3 percent by weight of the diamine reactant.

29. The method of claim 28 wherein said catalyst is phosphoric acid.

30. The method of claim 28 wherein said catalyst is magnesium oxide.

31. The method of claim 28 wherein said catalyst is calcium oxide.

* * * * *

UNITED STATES PATENT OFFICE
CERTIFICATE OF CORRECTION

PATENT NO. : 4,055,525
DATED : October 25, 1977
INVENTOR(S) : Thomas T. Cheng

It is certified that error appears in the above-identified patent and that said Letters Patent are hereby corrected as shown below:

At Column 2, line 1, - "R'-COOh" should be -- COOH

At Column 2, line 10, - "(II)" second instance, should be -- (III) --

At Column 4, line 35, - "ractant" should be -- reactant --

At Column 6, line 49, - "diocid" should be -- diacid --

At Column 9, line 67, between the words "electrical" and "mantle" insert -- heating --

At Column 12, line 2, after the word "initial" the numerals "7300" should be under Column 1, and the numerals "3700" should be under Column 2.

Signed and Sealed this

Twenty-first Day of March 1978

[SEAL]

Attest:

RUTH C. MASON
Attesting Officer

LUTRELLE F. PARKER
Acting Commissioner of Patents and Trademarks